United States Patent
Herud et al.

(10) Patent No.: US 11,000,905 B2
(45) Date of Patent: May 11, 2021

(54) ADAPTER SLEEVE

(71) Applicant: Kennametal Inc., Latrobe, PA (US)

(72) Inventors: Josef Konrad Herud, Herzogenaurach (DE); Marcus Paul, Fürth (DE)

(73) Assignee: KENNAMETAL INC., Latrobe, PA (US)

(*) Notice: Subject to any disclaimer, the term of this patent is extended or adjusted under 35 U.S.C. 154(b) by 0 days.

(21) Appl. No.: 16/021,872

(22) Filed: Jun. 28, 2018

(65) Prior Publication Data

US 2019/0001421 A1    Jan. 3, 2019

(30) Foreign Application Priority Data

Jun. 28, 2017  (DE) .......................... 102017210986.6

(51) Int. Cl.

| | |
|---|---|
| *B23B 51/10* | (2006.01) |
| *B23B 51/08* | (2006.01) |
| *B23B 31/02* | (2006.01) |
| *B23B 31/00* | (2006.01) |
| *B23B 31/20* | (2006.01) |
| *B23B 31/30* | (2006.01) |

(52) U.S. Cl.
CPC ............ *B23B 51/108* (2013.01); *B23B 31/02* (2013.01); *B23B 51/08* (2013.01); *B23B 31/005* (2013.01); *B23B 31/208* (2013.01); *B23B 31/305* (2013.01); *B23B 2231/0204* (2013.01); *B23B 2231/0264* (2013.01); *B23B 2231/04* (2013.01)

(58) Field of Classification Search
CPC ..... B23B 31/305; B23B 51/108; B23B 31/02; B23B 31/005; B23B 31/208; B23B 2231/04; B23B 2231/0204; B23B 2231/0264; B23B 31/00; B23B 31/20; B23B 51/08

See application file for complete search history.

(56) References Cited

U.S. PATENT DOCUMENTS

| | | | |
|---|---|---|---|
| 1,016,116 A |  | 1/1912 | Walters |
| 1,229,565 A | * | 6/1917 | Ahlgren ................ B23B 31/005 |
| | | | 408/226 |
| 5,609,446 A | * | 3/1997 | Link .................... B23B 29/248 |
| | | | 279/4.03 |
| 2004/0057804 A1 |  | 3/2004 | Jager |

(Continued)

FOREIGN PATENT DOCUMENTS

| | | |
|---|---|---|
| DE | 29616165 U1 | 1/1998 |
| DE | 102011106421 | 2/2012 |

(Continued)

OTHER PUBLICATIONS

Mar. 15, 2018 First office action.
Sep. 22, 2020 Office Action (non-US) CN App. No. 109128236A.

*Primary Examiner* — Eric A. Gates
*Assistant Examiner* — Paul M Janeski
(74) *Attorney, Agent, or Firm* — Larry R. Meenan

(57) ABSTRACT

An improved adapter sleeve is submitted which has a shank for insertion into a toolholder for a machine tool, wherein a tool socket for holding a tool is formed in the shank, wherein a number of slots are disposed along the shank so that the shank can be compressed during clamping, wherein a cutting head is formed which is arranged on a front side (F) of the shank. In one embodiment, the cutting head has an insert seat for a cutting insert.

11 Claims, 3 Drawing Sheets

(56) References Cited

U.S. PATENT DOCUMENTS

2005/0019119 A1    1/2005   Jager
2008/0232915 A1    9/2008   Reinhardt

FOREIGN PATENT DOCUMENTS

| EP | 0391695 B1 | 6/1994 | |
|----|-----------|--------|---|
| EP | 0687516 | 12/1995 | |
| GB | 2393676 A | 4/2004 | |
| WO | WO-2005002767 A1 * | 1/2005 | ........... B23B 27/141 |

* cited by examiner

ADAPTER SLEEVE

RELATED APPLICATION DATA

The present application claims priority pursuant to 35 U.S.C. § 119(a) to German Patent Application No. 102017210986.6 filed Jun. 28, 2017, which is incorporated herein by reference in its entirety.

FIELD

The present invention relates to an adapter sleeve comprising a shank for insertion into a toolholder, for example, a hydraulic expansion chuck. The toolholder in turn can be inserted into a machine tool. In the shank, a tool socket for holding a tool is formed, wherein a number of slots are disposed along the shank so that the shank can be compressed during clamping.

BACKGROUND

Adapter sleeves find use as adapters between a toolholder for a machine tool and a tool. In principle, it is possible to clamp the tool directly into the toolholder although the latter is usually only suitable for a particular diameter range. For tools with a diameter outside this diameter range, the toolholder must be replaced by a correspondingly suitable toolholder. To avoid this, one alternative is to use an adapter sleeve which is inserted as an adapter into the toolholder to enable smaller tools to be held which would not be directly mountable in the toolholder. The toolholder does not then need to be switched; instead it suffices to keep a corresponding set of adapter sleeves for different tools. This has the advantage that it is not necessary to keep several, usually expensive toolholders available which would also have to be changed over by an elaborate procedure but rather, in contrast, a less expensive set of adapter sleeves which are also easier to swap.

An adapter sleeve is disclosed, for example, in DE 10 2011 106 421 B3. The adapter sleeve has a cylindrical base body, into which a tool socket is incorporated. At one end the adapter sleeve has an adapter sleeve collar, which is integrally formed on the base body. The base body further comprises four longitudinal slots worked into its circumference that in the event of circumferential pressure being applied favor a reversible deflection of the base body in the direction of a central longitudinal axis of the adapter sleeve. The longitudinal slots extend over approximately 80% of the extent of the base body, and are continued in the adapter sleeve collar so that the longitudinal slots are open to the front.

SUMMARY

In one aspect, the objective of providing improved adapter sleeves is undertaken. This objective is achieved according to the present invention by an adapter sleeve having the features of claim 1. Advantageous embodiments, refinements and variants are the subject-matter of the dependent claims and following description.

The adapter sleeve serves as an adapter between a toolholder, which can be used in a machine tool, and a tool, in particular a rotary tool such as a drill. The adapter sleeve has a shank for insertion into the toolholder. The toolholder is also referred to as a chuck and is, for example, a hydraulic expansion chuck. In general the adapter sleeve is clamped in the toolholder, in other words, mounted in the toolholder so that it cannot rotate. To do so, a clamping force is applied in the radial direction to the adapter sleeve which is thereby clamped in the toolholder. The toolholder is typically a chuck, for example, an expansion chuck. To hold the tool, a tool socket is formed in the shank. In a similar fashion to how the adapter sleeve is inserted into the toolholder, the tool is inserted into the tool socket of the adapter sleeve. The clamping forces are then transferred from the toolholder via the adapter sleeve to the tool and clamp it so that it cannot rotate.

Along the shank a number of slots are formed to enable the shank to be compressed during clamping. Clamping requires the adapter sleeve to give slightly, so that the play between the toolholder and the adapter sleeve as well as between adapter sleeve and tool that is necessary for insertion can be eliminated and a clamping effect can be achieved.

Furthermore, a cutting head is formed which is arranged on a front end of the shank, in other words, the cutting head is arranged on the front end and during operation points towards the workpiece. The cutting head in its mounted state, in other words its clamped state, is accordingly arranged completely outside the toolholder. The cutting head is a part of the adapter sleeve. With the cutting head generally an additional functionality is advantageously realized, in other words, in addition to the functionality of the tool itself. The cutting head is used in particular for the additional machining of material. In other words, a machining of material is not necessarily carried out using only the tool that is mounted in the adapter sleeve but also additionally advantageously using the cutting head itself.

The slots preferably extend up to and into cutting head. In other words, the slots are formed not only along the shank but also in the cutting head. This advantageously improves the flexibility of the shank and improves the clamping of the adapter sleeve with cutting head. In particular, the slots here partially extend into the cutting head. In the present case "partially" is understood as meaning "partially in the longitudinal direction" and not "partially in the radial direction"; in other words. The cutting head has a head length and the slots extend in the longitudinal direction at least over a part of the total head length, preferably at least 10%, particularly preferably 40%. In a variant, the cutting head has a collar that is arranged at its rear end and thus represents an interface with the shank. In the mounted state, the collar in particular serves as a stop for the adapter sleeve in the toolholder. In this case the slots preferably extend in the longitudinal direction across the entire collar and are formed as extending past the collar and into the cutting head.

Basically, it is conceivable for an additional functionality to be provided even directly at the toolholder, although the disadvantage of this is that in the event of a change of functionality the entire toolholder also has to be changed. On the one hand, this is time-consuming and, on the other hand, a number of correspondingly designed toolholders must be kept available. Even when the toolholder is retained while using a simple adapter sleeve, the functionalities of the toolholder and the tool will normally no longer be matched to each other, for example, due to different geometries or dimensions.

A significant advantage of the invention consists in particular in that with the additional cutting head the adapter sleeve itself has an extended functionality. The adapter sleeve is used not exclusively as an adapter between machine tool and tool but is also used advantageously as a platform for other functions. For this purpose, the adapter sleeve has been developed at the front end, in other words, in the mounted state it projects partially out of the toolholder so that at the front end a number of other functions can be added and also are in fact added. Here the adapter sleeve does not simply project from the toolholder with a conventional collar but going beyond that with a head part, which in one variant includes a collar and which in any case has a front-end longitudinal functional section where the additional function is implemented. Due to the longitudinal functional section, the adapter sleeve is in particular longer than the usual adapter sleeves. The cutting head, which is located outside the toolholder, is about a quarter to a half of the length of the shank, which lies entirely within the toolholder. In other words, the cutting head has a head length which corresponds to about 25% to 50% of a shank length of the shank.

In comparison with the toolholder, the adapter sleeve is an inexpensive component which is also easy to swap over, so that additional functions on the adapter sleeve are correspondingly advantageous as compared with additional toolholder functionalities. For a user this yields the specific advantage that with a single, conventional toolholder significantly more functionality can be realized in operation since on the one hand the most diverse tools can be operated using the appropriate adapter sleeves, and on the other hand the adapter sleeves themselves also additionally provide an extended functionality.

The adapter sleeve also advantageously makes a modular concept possible, with which a tool, by combining with an appropriate adapter sleeve, can be extended by an additional functionality, which can also advantageously be changed by switching to a different adapter sleeve.

The shank is in particular cylindrical and has a circumferential face which, in the clamped state, is in contact with the toolholder. In particular, the shank is formed as a hollow cylinder in order to receive the tool, so that the tool socket is a cylindrical cavity in the shank. The adapter sleeve has in particular a base at the rear end. The tool is held in the adapter sleeve, in particular centrally.

The additional functionality is preferably a material machining process, in other words, the cutting head is preferably designed for additional material machining, in particular for the removal of material. In addition to material machining by the tool, a machining of material by the adapter sleeve, more precisely by the cutting head, also takes place during operation. The cutting head is then configured as a tool platform and has an additional tool or a socket for an additional tool. Alternatively or additionally, the functionality is, for example, a flute continuation, that is, the cutting head has a chip guide, which extends a flute of the tool in order to ensure improved chip removal.

In a particularly preferred embodiment, the cutting head has a cutting edge as an additional tool for additional material machining. The machining radius of the tool is considerably enlarged by the additional cutting edge. In operation the cutting edge is used for machining a workpiece by cutting away material. This machining is carried out in addition to machining with the tool that is inserted in the adapter sleeve. The cutting edge is in particular arranged on the front end. The cutting edge preferably extends, starting from the toolholder, outwardly in the radial direction. Accordingly, in the case of the inserted tool, the cutting edge advantageously starts directly at the tool, so that an uninterrupted removal of material is ensured.

Alternatively or in addition to the above-mentioned cutting edge, the cutting head appropriately has an insert seat to which a cutting insert can be attached for the purpose of additional material machining. The cutting insert then has a cutting edge, in particular as already described above. The cutting insert is in particular a conventional cutting insert, but in one variant is a cutting insert specially adapted to the geometry of the adapter sleeve. The insert seat is in particular formed to be complementary to the cutting insert. The insert seat is in particular a recess in the cutting head with a number of abutment edges for positioning a cutting insert. The insert seat extends in particular parallel to the longitudinal direction.

A threaded hole is expediently formed in or on the insert seat into which a screw for attaching the cutting insert can be screwed. A significant advantage of the embodiment with the insert seat is that the additional tool is swappable and that therefore, on the one hand, when the cutting edge is worn a new cutting insert can simply be installed and, on the other hand, even different cutting edge geometries may be mounted on the same adapter sleeve.

The cutting edge and the insert seat in each case in particular form a region of the cutting head that is especially highly stressed mechanically since this is where the cutting head engages the workpiece. Particularly in the case of an insert seat with a recess for a cutting insert, the cutting head also has in particular a decreased robustness in precisely that area. For this reason, in a useful embodiment the slots extend in the longitudinal direction at most as far as the insert seat or as far as the cutting edge of the cutting head. This ensures that the particularly stressed region with cutting edge or insert seat is not additionally weakened by the slots. In specific terms the cutting head has a head length and is divided in the longitudinal direction into two sections, namely a front section, on which the additional functionality is implemented, and a rear section, which is connected to the shank and which is not necessarily equal to the above-mentioned collar. The slots are then disposed only on the rear section while the cutting edge or the insert seat or both are disposed only on the front section. In particular, in the case of a chip guide as described above this is a recess, which possibly uncovers some of the slots such that they appear to be open at the front end.

In a particularly advantageous embodiment, the front of the cutting head is of a conical shape and has a conical face for creating a counterbore hole when material is being machined. This makes it possible to make a counterbore hole in a simple way using the adapter sleeve, in particular simultaneously with the drilling of an associated hole. This embodiment is expediently combined with the above-mentioned embodiment with cutting edge or with an insert seat. The cutting head then is conical in shape at the front end; in other words, it converges inwardly. Due to the inserted tool, a cutting point is then formed which usually protrudes in the longitudinal direction so that a suitably deep hole can be obtained.

An essential feature of an adapter sleeve in general and in particular also of the present adapter sleeve is that it is sufficiently compressible for the tool to be clamped in the tool socket at the same time as it is itself clamped in the toolholder. The slots serve for this purpose. At the time of manufacture, the slots are incorporated in the circumferential face, for example, by cutting through an initially fully formed circumferential face or directly when the circumferential face is being made, for example, by 3D printing. The circumferential face is divided as a result into individual segments, which are separated by the slots. At the rear end, the segments are connected together via the base. Due to the slots, the adapter sleeve is made correspondingly more flexible and the segments can move closer together during clamping. The slots thus provide a space for deflection thereby making a compression possible.

Preferably, a plurality of slots, in particular four slots, are formed, which are distributed circumferentially around the adapter sleeve. The slots are expediently arranged in the manner of an equal division, in other words, a corresponding number of same-sized segments are formed. Each slot preferably measures between 0.5 mm and 2 mm wide. This corresponds in particular to a thickness of a grinding wheel, by means of which the slot is created in the circumferential face during manufacture.

As regards the form of the slots, different variants are suitable. It is essential that the circumferential face of the adapter sleeve is cut all the way through, thus forming segments which can move towards each other. In a preferred variant, the shank and the cutting head are arranged one behind the other in a longitudinal direction and the slots each extend in the longitudinal direction.

An additional, solid head section at the front end of an adapter sleeve may initially oppose the above-mentioned compressibility or flexibility since the slots are closed off again by a corresponding head section so that the segments formed by the slots are then no longer sufficiently movable. To prevent this, the slots in a conventional adapter sleeve extend right up to the front end and are open to the front, as shown, for example, in DE 20 2011 106 421 B3, which was mentioned at the beginning. In the case of the adapter sleeve of the present application, the slots extend into the cutting head in order to ensure an appropriate compressibility of the shank.

However, in the case of a cutting head in the sense of the present application, slots are at first sight, under certain circumstances, a hindrance. In particular, a certain degree of precision is required for the additional functionality, in other words, a specific positioning and dimensioning of the cutting head. In the case of slots open at the front end, the cutting head would however also be divided into segments which can move towards each other and be made correspondingly more flexible and thus not be rigid. The precision required for the additional function could then no longer be guaranteed.

In order to solve the contradiction thus possibly arising between the necessary flexibility of the adapter sleeve on the one hand and the necessary rigidity of the cutting head on the other hand, the slots therefore preferably extend no more than partially into the cutting head. In other words, the slots preferably extend only partially into the cutting head, that is, not over the entire head length but only over a part of the head length, preferably over 10% to 50% of the head length, especially preferred over 40% of the head length. In particular, this is based on the consideration that a flexibilization of the adapter sleeve is not necessary outside the toolholder and for this reason the slots do not need to extend all the way to the front end. Instead, it is sufficient for the slots to be brought at least out of the toolholder and to extend at least partially into the cutting head so that the segments within the toolholder have adequate flexibility. In contrast, the cutting head has no slots at the front end, thereby ensuring a corresponding rigidity. The slots are thus in particular closed at the front end and not open. Depending on the design and particular geometry of the cutting head, in one suitable variant only a first number of slots extend at most partially into the cutting head, whereas a second number of slots are open at the front end, in other words, extending as far as the front end. The slots which are open at the front end are the result in particular of recesses in the cutting head which are used for implementing certain functionalities.

The slots extend in particular over at least 75%, preferably at least 90% of the shank length.

The slots preferably take the form of continuous longitudinal slots. In the case of a continuous configuration, it is advantageously ensured that the segments of the circumferential face are sufficiently separated from each other. Continuous slots are in particular produced by a grinding wheel being moved along the circumferential face. A continuous slot in each case starts from the base of the shank and extends up to a position in the cutting head, thereby forming a longitudinal gap along the adapter sleeve. The slots are preferably straight, in other words, in each case parallel to the longitudinal direction and also parallel to each other. Alternatively, a non-straight design is also suitable, for example, a helical configuration.

The adapter sleeve is preferably manufactured as a single piece. By this is meant in particular that the adapter sleeve is not assembled from multiple parts, but is manufactured only in one piece, that is, as a single part. The cutting head is thus formed integrally with the shank. Preferably, the adapter sleeve is made starting from a blank, which already has a shank and a head, while the slots and contours which are required for forming the cutting head are ground into the blank. Alternatively, the adapter sleeve is manufactured by means of a 3D printing process, wherein the shank and the cutting head are in particular formed at the same time.

In the one-piece embodiment, the adapter sleeve is also preferably made only from a single material. In a further development, however, an additional coating is applied in particular to the cutting head and there preferably in the area of the cutting edge.

In one suitable embodiment, the adapter sleeve is made of tool steel. This is particularly tough and at the same time inexpensive.

In a suitable alternative to a one-piece embodiment, the adapter sleeve is formed of several pieces and has a plurality of components which are connected to each other. The components are, for example, soldered, glued, or joined together by positive locking or the like. While a one-piece adapter sleeve is particularly simple and robust, a multi-piece adapter sleeve offers an especially great freedom of design, for example, with respect to the materials from which the individual components are manufactured.

BRIEF DESCRIPTION OF THE DRAWINGS

An exemplary embodiment of the invention is explained in detail below in reference to the drawing. Shown therein are.

DETAILED DESCRIPTION

Figure 1:
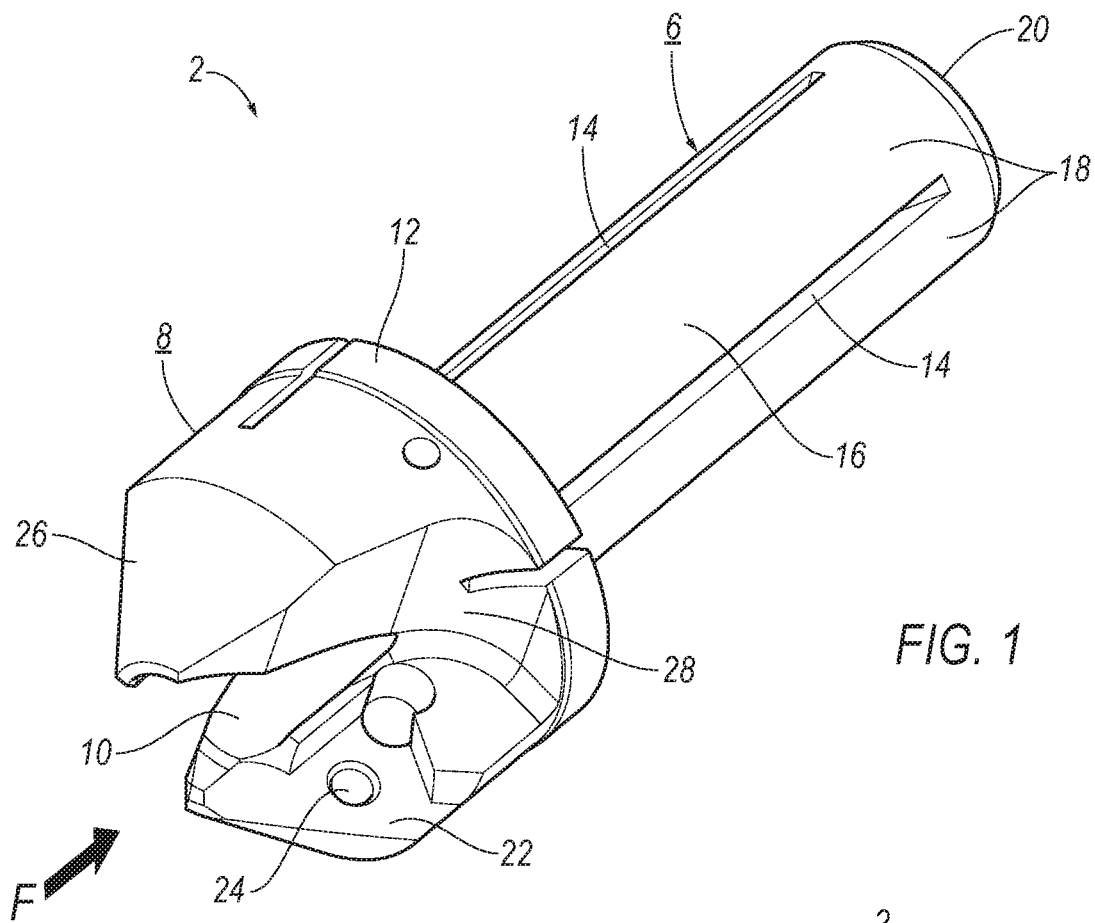
FIG. 1 an adapter sleeve in a perspective view,
FIG. 2 the adapter sleeve in a front view,
FIG. 3 the adapter sleeve in a side view,
FIG. 4 the adapter sleeve in another side view,
FIG. 5 the adapter sleeve in a longitudinal sectional view, and
FIG. 6 a blank for the production of the adapter sleeve.
Figure 2:
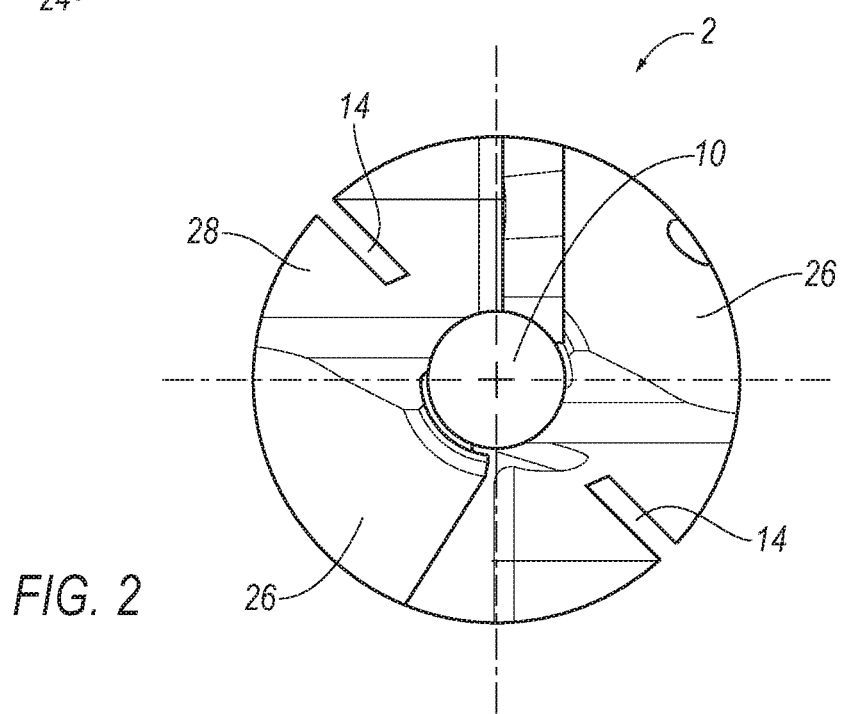
Figure 3:
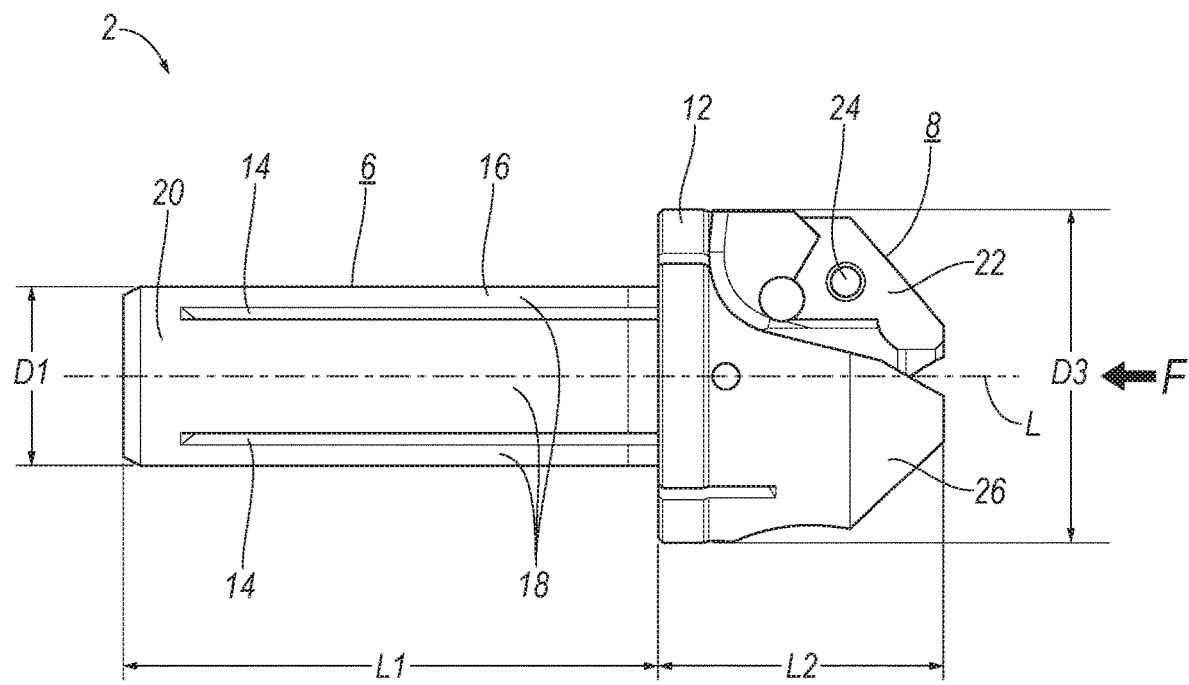

FIGS. 1 through 5 show a preferred embodiment of an adapter sleeve 2 in different views. A blank 4, from which the adapter sleeve 2 is manufactured, is shown in FIG. 6.

The adapter sleeve 2 has a shank 6 to which a cutting head 8 is connected at the front end, that is, the cutting head is arranged at a front end F. In this case the adapter sleeve 2 is one piece, in other words, is manufactured in one piece, in other words, the shank 6 and the cutting head 8 are integrally connected to each other. The shank 6 is used for inserting the adapter sleeve 2 into a toolholder (not shown in greater detail) of a machine tool, which is also not shown. Furthermore, a tool socket 10 is incorporated in the adapter sleeve 2 and extends straight through the shank 6 and the cutting head 8 and in a longitudinal direction L. The tool socket 10 can be seen particularly well in the front view of FIG. 2.

The shank 6 has a shank length L1 and when mounted in the toolholder is fully inserted into that toolholder. The cutting head 8 with a head length L2 joins directly to the shank 6. In the present case, the cutting head 8 is approximately half the length of the shank 6. The cutting head 8 also has a collar 12, which is arranged at the rear end and thus represents an interface with the shank 6. In the mounted state, the collar 12 serves as a stop, up to which the adapter sleeve 2 is inserted into the toolholder.

A number of slots 14, in this case four, also extend in the longitudinal direction L. In the exemplary embodiment shown, these take the form of continuous longitudinal slots which extend in a straight line, in other words, parallel to the longitudinal direction L. It can be seen clearly, above all in the side view of FIG. 3, that the slots 14 extend not only along the shank 6 but also into the cutting head 8. This ensures on the one hand a suitable compressibility of the shank 6 during clamping and on the other hand an appropriate rigidity of the cutting head 8. The slots 14 extend over about 90% of the shank length L1 and about 40% of the head length L2. Here the slots 14 extend completely through the collar 12.

In the embodiment shown, the shank length L1 is 35.5 mm and the head length L2 19 mm, while the collar 12 is in this case 3 mm long. The invention is not, however, restricted to these values. Generally, the cutting head 8 is shorter than the shank 6, and the head length L2 is between 25% and 50% of the shank length L1.

Figure 4:
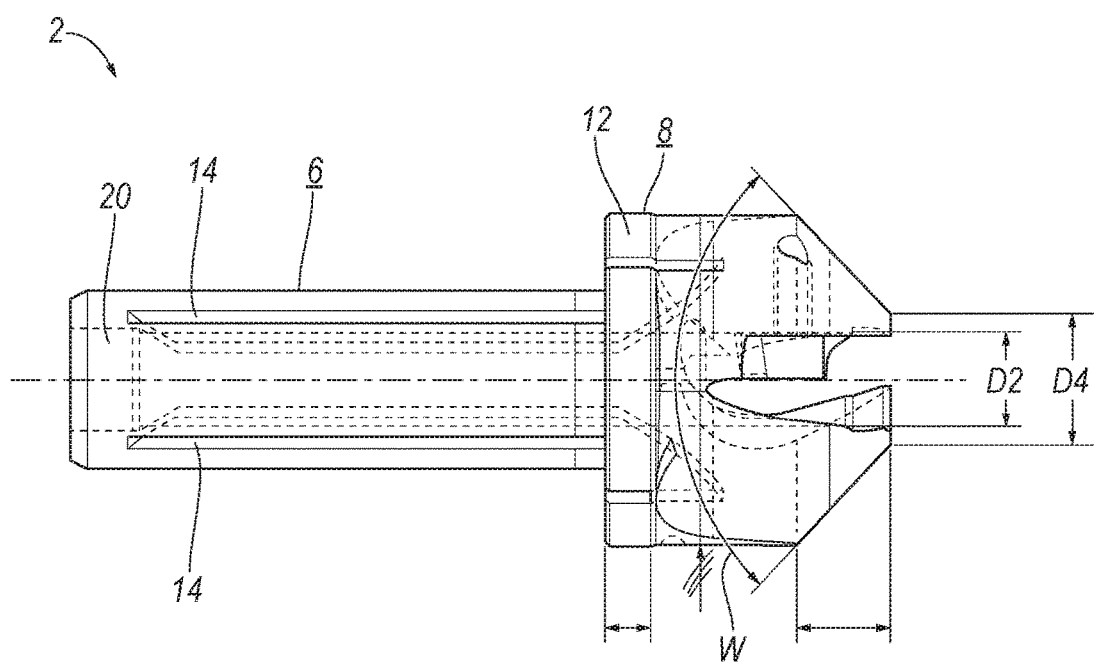
Figure 5:
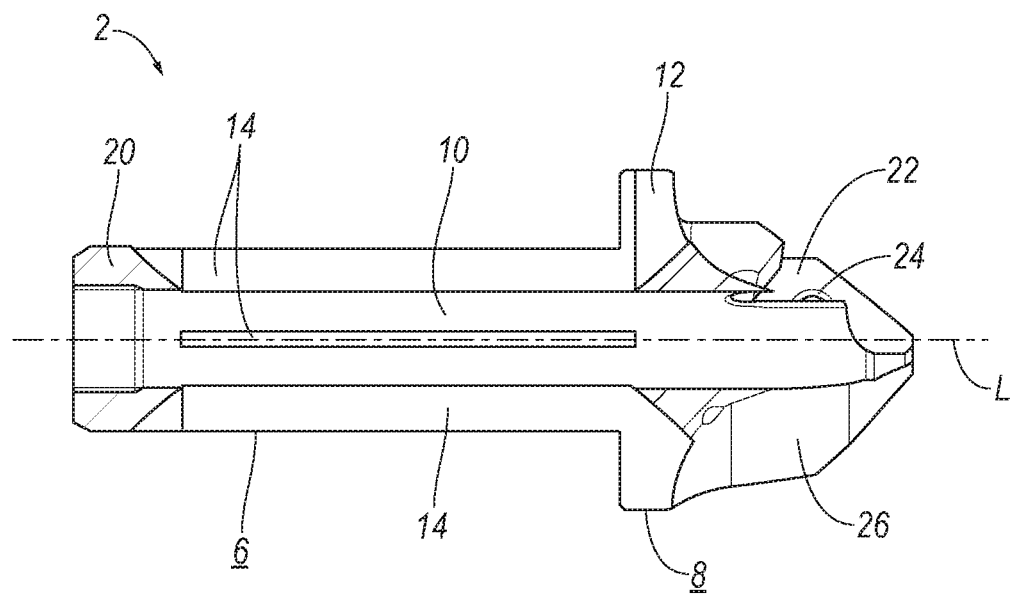
Figure 6:
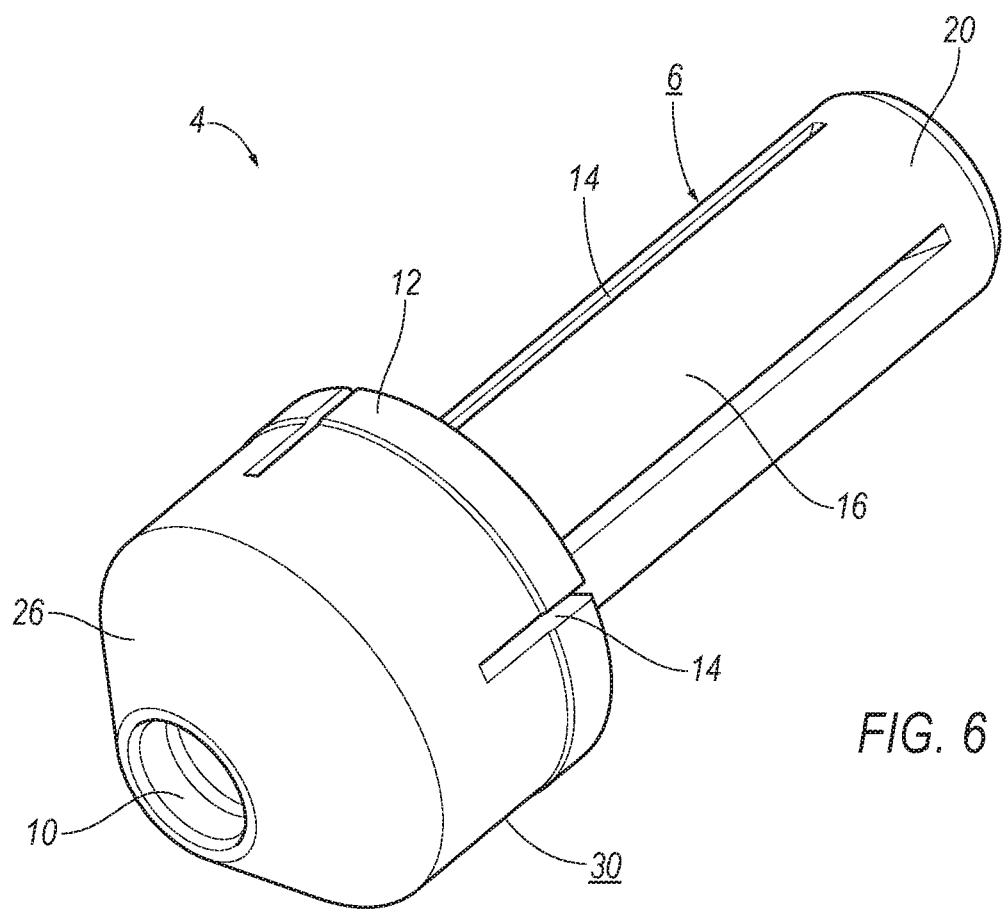

As is in particular shown in FIGS. 4 and 5, in the present case the slots 14 are ground into the adapter sleeve from the outside by means of a grinding wheel. The shank 6 is cylindrical in shape and has a circumferential face 16, which is divided by the slots 14 into a corresponding number of segments 18. At the rear end, the slots 14 extend only as far as the base 20, which holds the segments 18 together, and in the present case also forms a stop in the longitudinal direction L for the tool (not shown). Since they are produced by means of a grinding wheel, the slots 14 run in a radial direction at the front and rear ends. The slot 14 thus takes a wedge-shaped form at its front and rear ends.

The cutting head 8 is equipped with an additional functionality that complements the functionality of the tool which is to be inserted. In the present exemplary embodiment, the cutting head 8 has an insert seat 22 into which a cutting insert (not shown) can be inserted, which at the front end in operation makes additional material removal possible in the area around the tool. In the present case, the insert seat 22 is triangular in shape, as can be seen in particular in FIG. 1. The shape of the insert seat 22 is not, however, limited to the shape shown, but is in particular adapted to the geometry of the cutting insert. The insert seat 22 in the present case has a number of abutment edges 24 for positioning the cutting insert. A threaded hole 24 for attaching the cutting insert is arranged in the insert seat 22, with which the cutting insert can be fastened in the insert seat 22 by means of a screw. In an alternative (not shown), a cutting edge is formed directly and in particular at the front end on the cutting head 8.

In the present case, the cutting head at the front end has a conical shape and has a correspondingly conical face 26 which runs inwardly towards the front. Here, the cutting head has a cone angle W, which in the present case is 92°, although other values are also suitable. The cutting edge either of a cutting insert or directly on the cutting head then runs along the conical face, thereby allowing the cutting head 8 to form a counterbore hole.

Furthermore, the cutting head has as an additional functionality a chip guide 28 which makes possible an improved removal of chips during operation. The generally conical and cylindrical form of the cutting head is breached by the chip guide 28.

To ensure the cutting head 8 is as robust as possible in the area of the insert seat 22, the slots 14 only partially extend into the cutting head 8, in other words, only partially in the longitudinal direction L.

The adapter sleeve 2 serves as an adapter between the toolholder and the tool. The shank 6 accordingly has a shank outside diameter D1 which corresponds to an inner diameter of the toolholder, and the tool socket 10 has a diameter which is a shank inner diameter D2 and which corresponds to an outer diameter of the tool. The circumferential face then has a thickness, which is calculated as the difference between the shank outside diameter D1 and the shank inner diameter D2. The cutting head 8 has at least at the rear end a head diameter D3, which is larger than the shank outside diameter D1. Due to its conical design, the cutting head 8 tapers at the front end and in the embodiment shown has at the front end a front diameter D4 which is less than the shank outside diameter 6. However, this is not mandatory.

In the exemplary embodiment shown, the shank outside diameter D1 measures 12 mm, the shank inner diameter D2 6.35 mm, the head diameter D3 22.5 mm and the front diameter D4 8.95 mm. The invention is not, however, restricted to these values and due to the adapter function of the adapter sleeve 2 is not restricted either to specific relationships between these values.

A blank 4 is shown in a perspective view in FIG. 6. The blank 4 serves as a starting point for the production of the adapter sleeve 2. The blank 4 has a head 30, from which the cutting head 8 is manufactured by, for example, material removal. In the present case, the slots 14 have already been cut into the blank 4. It can be clearly seen that the slots 14 extend only partially into the head 30 and are therefore closed at the front end. In comparison with FIG. 1, it is apparent that the slots 14, even after completion of the adapter sleeve 2, thus do not extend all the way through the cutting head 8. It is, however, evident that when material is removed from the cutting head 8 at least some of the slots 14 are exposed in such a manner that they are open at the front end. This applies in the present case to the slots 14 which open into the chip guide 28.

The invention claimed is:

1. An adapter sleeve, comprising:
   a cylindrical shank having a circumferential face for insertion into a toolholder of a machine tool, the shank having a shank length, and defining a front end and a rear end and having a base at the rear end;
   a cutting head formed on the front end of the shank, the cutting head having a head length; and
   a tool socket extending in a longitudinal direction through the shank and the cutting head,
   wherein a tool socket is formed in the shank for holding a tool; and
   wherein a number of slots are disposed along the shank so that the shank can be compressed during clamping, wherein the slots originate axially forward from the rear end of the shank, wherein the slots extend in a radial direction from the circumferential face only partially into the cutting head; and wherein the slots extend in the longitudinal direction from the shank at most only partially into the cutting head.

2. The adapter sleeve according to claim 1, wherein the cutting head comprises an insert seat to which a cutting insert can be attached.

3. The adapter sleeve according to claim 2, wherein the slots extend in the longitudinal direction at most as far as the insert seat.

4. The adapter sleeve according to claim 1, wherein the cutting head at the front end has a conical shape and has a conical face for creating a counterbore hole when material is being machined.

5. The adapter sleeve according to claim 1, wherein the shank and the cutting head are arranged one behind the other in a longitudinal direction and the slots each extend in the longitudinal direction.

6. The adapter sleeve according to claim 1, wherein the slots take the form of continuous longitudinal slots.

7. The adapter sleeve according to claim 1, wherein the adapter sleeve is a single continuous piece.

8. The adapter sleeve according to claim 1, wherein the adapter sleeve is formed of tool steel.

9. The adapter sleeve according to claim 1, wherein the slots extend in the longitudinal direction about 90% of the shank length.

10. The adapter sleeve according to claim 1, wherein the cutting head at the front end has a conical shape and has a conical face with a cone angle, W, of about 92 degrees.

11. The adapter sleeve according to claim 1, wherein the shank has a shank outside diameter, and wherein the cutting head has a front end with a conical shape with a front diameter less than the shank outside diameter.

* * * * *